UNITED STATES PATENT OFFICE.

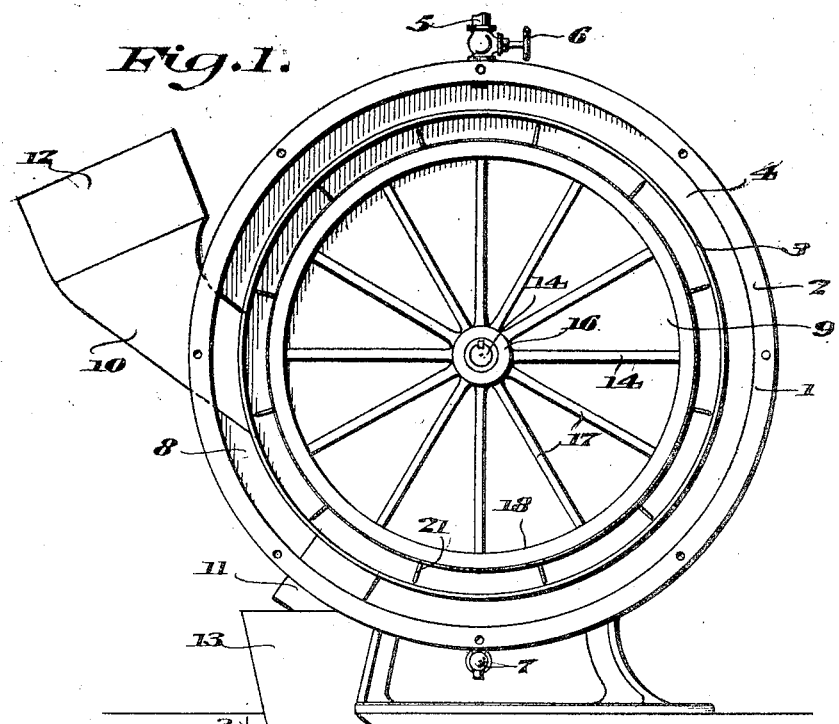
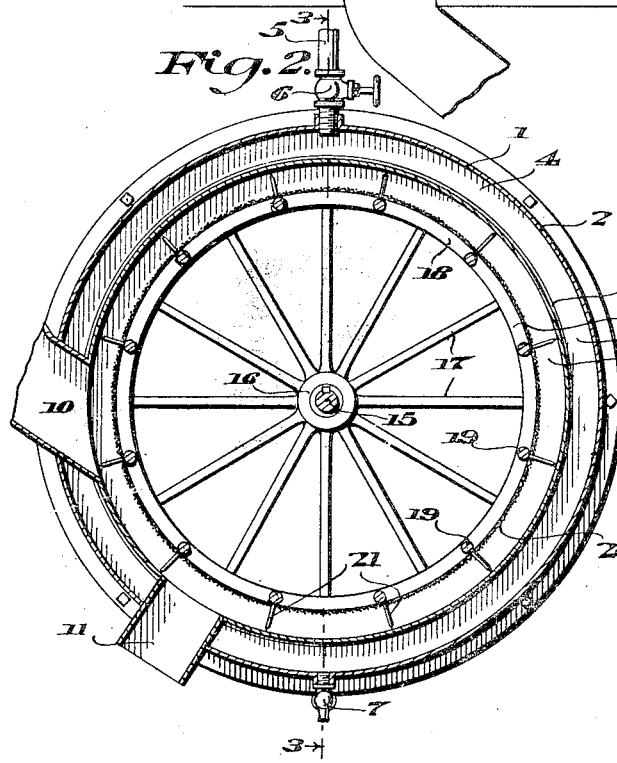
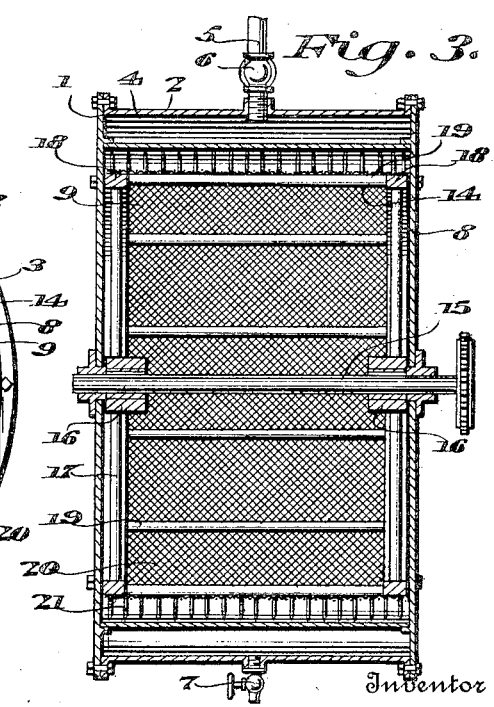

ALVA A. EVANS, OF ROCHESTER, TEXAS.

COTTON-DRYING APPARATUS.

1,128,592.  Specification of Letters Patent.  Patented Feb. 16, 1915.

Application filed May 5, 1914. Serial No. 836,531.

*To all whom it may concern:*

Be it known that I, ALVA A. EVANS, a citizen of the United States, residing at Rochester, in the county of Haskell and State of Texas, have invented new and useful Improvements in Cotton-Drying Apparatus, of which the following is a specification.

My invention relates to cotton drying apparatus, designed particularly for drying the wet staple, the object of the invention being to provide a drier which is simple of construction, reliable and efficient in operation, and which may be constructed and operated at a comparatively low cost.

A further object of the invention is to provide a device of the described character which is adapted to be heated by a fluid medium, such as steam, in an efficient manner.

The invention consists of the features of construction, combination and arrangement of parts herein fully described and claimed, reference being had to the accompanying drawing in which:—

Figure 1 is a view in side elevation of a cotton drier embodying my invention, with the adjacent side plate removed to disclose the interior construction. Fig. 2 is a vertical section through the drier taken in a plane at right angles to the shaft of the rotary feeder. Fig. 3 is a transverse section on the line 3—3 of Fig. 2.

Referring to the drawing, 1 designates the annular casing of the drier, which comprises spaced circumferential walls 2 and 3 forming an interposed channel or chamber 4 for the reception and circulation of the heating medium such as steam. The said space or chamber is provided at a suitable point with a steam inlet or supply pipe 5, leading from a suitable course of steam supply and having therein a controlling valve 6. A drain valve 7 may also be provided at a suitable point for the drainage off of the water of condensation. The casing structure is completed by the addition of side plates 8, which are preferably detachable and secured in position in any preferred way. At suitable points the drying chamber 9 formed within the annular casing is provided with a feed inlet 10 and an outlet 11. The feed inlet 10 may communicate with a receptacle 12, which may be in the form of an ordinary hopper or a boll huller. The outlet 11 is so arranged as to discharge the dry cotton into a conveyer 13 for transfer to any delivery point.

Arranged within the chamber 9 is a rotary feeder 14, comprising a shaft 15 journaled in the walls 8, hubs 16 fixed to the shaft, arms or spokes 17 radiating from the hub, rims 18 carried by the spokes, cross bars 19 extending between the rims at fixed intervals around the feeder, and a body 20 of woven wire or other screen material covering or inclosing the frame of the wheel so formed, so as to prevent the cotton from becoming entangled in the wheel, while permitting the heated air within the chamber 9 to have free circulation throughout the entire chamber. The cross bars 19 are provided with projecting pins or spurs 21 acting as rakes to positively engage the cotton supplied through the inlet 10, to spread the same over the surface of the screen drum or wheel, and to insure a positive carrying of the cotton around between the inlet and outlet, while preventing the cotton at any point from becoming choked in the casing.

It will be understood that in the use of the device the steam or other fluid medium is supplied to the space or chamber 4 to heat the internal drying space or chamber 9, the internal heat being maintained at a proper drying temperature, and that when the chamber 4 is heated initially to the proper degree the apparatus is set into action. The cotton supplied through the inlet 10 is taken up and spread over the surface of the drum by the rake teeth and carried around in the form of a thin web or sheet which is subjected to the drying action of the heated air and finally discharged through the outlet 11 to the conveyer 13 for transfer to the delivery point. By this mode of treatment the cotton may be thoroughly and rapidly dried, without injury thereto, and without the necessity of conveying the same through an extended course of travel.

I claim:—

1. A cotton drying apparatus comprising an annular casing composed of spaced circumferential walls forming an internal drying chamber and a heating channel surrounding the same, the said drying chamber being provided with an inlet and an outlet and the said channel with means for the introduction of a fluid heating medium, and a rotary perforate drum within the drying chamber for conveying the cotton in the form of a thin web between the inlet and outlet, said drum being provided with peripheral rake teeth.

2. A cotton drying apparatus comprising an annular casing composed of spaced outer walls, arranged to provide an internal drying chamber and a heating channel surrounding the same, said drying chamber being provided with an inlet and an outlet and said heating chamber with means for the introduction of a fluid heating medium thereto, a shaft journaled in the side walls of the drying chamber, and a drum carried by said shaft, said drum embodying spaced sets of radial arms, rims carried by the arms, cross bars extending between the rims at fixed intervals around the drum, a body of screen material inclosing the frame of the drum so formed, and projecting rake teeth upon the said cross bars.

In testimony whereof I affix my signature in presence of two witnesses.

ALVA A. EVANS.

Witnesses:
G. M. BUCKNER,
JOHN BROWN.